(12) United States Patent
Fitch et al.

(10) Patent No.: US 11,733,047 B2
(45) Date of Patent: Aug. 22, 2023

(54) GEO-LOCATION STRUCTURE MAPPING

(71) Applicant: Lokion Interactive, LLC, Memphis, TN (US)

(72) Inventors: Christopher Fitch, Memphis, TN (US); Sam Lee, Memphis, TN (US); Kevin Yancy, Memphis, TN (US); Vaskin Kissoyan, Memphis, TN (US); Mike O'Hearn, Memphis, TN (US); Dale Smith, Memphis, TN (US); Douglas O'Brien, Memphis, TN (US); Patrick Miller, Memphis, TN (US); Marcus Stafford, Memphis, TN (US)

(73) Assignee: LOKION INTERACTIVE, LLC, Memphis, TN (US)

( * ) Notice: Subject to any disclaimer, the term of this patent is extended or adjusted under 35 U.S.C. 154(b) by 154 days.

(21) Appl. No.: 17/168,352

(22) Filed: Feb. 5, 2021

(65) Prior Publication Data

US 2021/0156694 A1 May 27, 2021

Related U.S. Application Data

(62) Division of application No. 16/196,396, filed on Nov. 20, 2018, now Pat. No. 10,955,248.

(Continued)

(51) Int. Cl.
*G01C 21/20* (2006.01)
*H04W 4/024* (2018.01)
(Continued)

(52) U.S. Cl.
CPC ....... *G01C 21/206* (2013.01); *G01C 21/3691* (2013.01); *G06T 11/60* (2013.01);
(Continued)

(58) Field of Classification Search
CPC . G01C 21/206; G01C 21/3691; H04W 4/024; H04W 4/33; H04W 4/029; G06T 11/60; G06F 3/0481
See application file for complete search history.

(56) References Cited

U.S. PATENT DOCUMENTS 6,029,173 A 2/2000 Meek et al.
6,728,636 B2 4/2004 Kokojima et al.
(Continued)

FOREIGN PATENT DOCUMENTS

JP 2005347827 A 12/2005
JP 2008055071 A 3/2008

*Primary Examiner* — Tarek Elarabi
(74) *Attorney, Agent, or Firm* — Buchanan Ingersoll & Rooney PC

(57) ABSTRACT

Exemplary methods and systems provide for production of geographically located, accurate indoor maps of physical spaces and provide navigation guidance for users in physical spaces, and process requests for users related to available physical space within said physical spaces. Aggregated information about the physical spaces is curated and converted using automated procedures into a data model that contains all elements of said physical spaces, including geographic data about the physical space's location on the globe. The system and computer program embodiments retrieve the converted data, load it on mobile devices or computers, rendering it on these devices in the correct global geographic context, allowing users to interact with the data to select rooms, and send and receive requests to and from external systems regarding these selections. Users navigate within the physical spaces using mobile devices and the computer program embodiments in tandem to provide accurate directions and guidance.

7 Claims, 7 Drawing Sheets

Related U.S. Application Data

(60) Provisional application No. 62/589,718, filed on Nov. 22, 2017.

(51) Int. Cl.
*H04W 4/029* (2018.01)
*G06T 11/60* (2006.01)
*G01C 21/36* (2006.01)
*H04W 4/33* (2018.01)
*G06F 3/0481* (2022.01)

(52) U.S. Cl.
CPC .......... *H04W 4/024* (2018.02); *H04W 4/029* (2018.02); *H04W 4/33* (2018.02); *G06F 3/0481* (2013.01)

(56) References Cited

U.S. PATENT DOCUMENTS

| | | |
|---|---|---|
| 9,116,003 B2 | 8/2015 | Khorashadi et al. |
| 9,140,559 B2 * | 9/2015 | Khorashadi ............ G01C 21/20 |
| 9,357,346 B2 | 5/2016 | Jagannath |
| 9,429,433 B2 | 8/2016 | Hendrix |
| 9,429,434 B2 | 8/2016 | O'neill et al. |
| 9,829,339 B2 | 11/2017 | Bass et al. |
| 2004/0193365 A1 | 9/2004 | Kokojima et al. |
| 2015/0260541 A1 | 9/2015 | Smith |
| 2015/0347455 A1 * | 12/2015 | Stanger .................. G06Q 90/20 707/829 |
| 2018/0149481 A1 | 5/2018 | Hirai |
| 2019/0086212 A1 * | 3/2019 | Koshy .................. H04W 4/024 |

\* cited by examiner

GEO-LOCATION STRUCTURE MAPPING

CROSS REFERENCE TO RELATED APPLICATIONS

This application is a divisional patent application of U.S. patent application Ser. No. 16/196,396, filed Nov. 20, 2018, which claims priority to U.S. Provisional Patent Application No. 62/589,718, filed Nov. 22, 2017.

FIELD

The present disclosure is related to generating geo-location maps for venues that include enclosed physical structures and surrounding exterior spaces.

BACKGROUND

Guests and prospective guests of venues increasingly demand physically accurate, interactive indoor maps of those venues, viewable and manipulatable on the guest's mobile device or desktop computer, in order to select a guest room, other destinations, or other points of interest, navigate from place to place within a venue, and perform other interactive tasks that may become commonplace and expected in the near future as mobile devices and indoor positioning technologies become more powerful. However, it is difficult to create physically accurate indoor maps of venues for retrieval, rendering, and manipulation on mobile devices and desktop computers. As a result, venues find it difficult to provide the maps and related interactive tools that guests demand.

SUMMARY

An exemplary method for generating a geolocation map for a venue is disclosed. The method comprising: receiving physical layout data associated with the venue; generating a venue map based on the received data; converting each map vector into an anchor point to generate a converted venue map; determining whether the converted venue map includes at least one Bezier curve; converting any identified Bezier curves into at least one anchor point; comparing at least one feature of the converted venue map with the physical layout data; revising the converted venue map for comparison results outside of a predetermined threshold; generating a final venue map having at least one floor map from one of the revised venue map or converted venue map in a database following when the converted venue map meets predetermined criteria; and geolocating the final venue map on a world geodetic coordinate system.

An exemplary system for generating geolocation maps for a venue is disclosed. The system comprising: an interface for receiving physical layout data associated with the venue; a processor configured to: generate a venue map based on the received data; convert each map vector into at least anchor point to generate a converted venue map; determine whether the converted venue map includes at least one Bezier curve; convert any identified Bezier curves into at least one anchor point; compare at least one feature of the converted venue map with the physical layout data; modify the converted venue map for comparison results outside of a predetermined criteria; generate a final venue map having at least one floor map from one of the revised venue map or converted venue map in a database following the comparison; and geolocate the final venue map on a world geodetic coordinate system; and memory for storing the final venue map and memory for storing the final venue map.

An exemplary computer readable medium encoded with a computer program product for generating a geolocation map for a venue is disclosed. When the computer readable medium is placed in communication with computer processor, the computer program product causing the processor to perform the method, comprising: receiving physical layout data associated with the venue; generating a venue map based on the received data; converting each map vector into at least one anchor point to generate a converted venue map; determining whether the converted venue map includes at least one Bezier curve; converting any identified Bezier curves into at least one anchor point; comparing at least one feature of the converted venue map with the physical layout data; revising the converted venue map for comparison results outside of a predetermined threshold; generating a final venue map having at least one floor map from one of the revised venue map or converted venue map; and storing the final venue map in memory.

An exemplary device for providing dynamic floor guidance in a venue is disclosed. The device being configured to communicate with a system comprising at least one server and a plurality of networked positioning nodes, the device comprising: a graphical user interface configured for generating a venue map configured to provide interactive guidance to a user; and a processor configured to send signals to the graphical user interface for generating and updating a display of the venue map based on input provided by the user, the processor generating the signals based on a venue map data file, wherein the processor is configured to wirelessly receive geolocation data in real-time from the server based on user input.

An exemplary system for generating a geolocation map for a venue is disclosed. The system comprising: an interface for connecting to at least one external device; memory for storing venue layout data received via the interface; a processor configured to: manage storage of floorplan data and attributes associated with a venue; determine whether a threshold amount of information necessary for generating a venue map has been received; generate a final venue map using the floorplan data and attributes stored in memory; and generate route guidance data for overlaying on the final venue map, when geolocation data is received in real-time from a mobile processing device via the interface.

DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to systems and methods for generating maps for the interior of an open or closed physical structure and/or space. The physical structures and/or spaces can include homes, office buildings, entertainment venues, hotels, restaurants or any other venue having floorplan and one or more interior points of interest (e.g., rooms, areas, structures, or any other interior features of relevance or interest as desired). The generated maps can be viewed through an application executing on a mobile device, thereby allowing a user to traverse through the interior of the structure from a starting point to a desired destination. The generated route having an interactive feature in which the application generates audible FIG. 1 illustrates an overview of a map generation system in accordance with an exemplary embodiment of the present disclosure.

Figure 1:
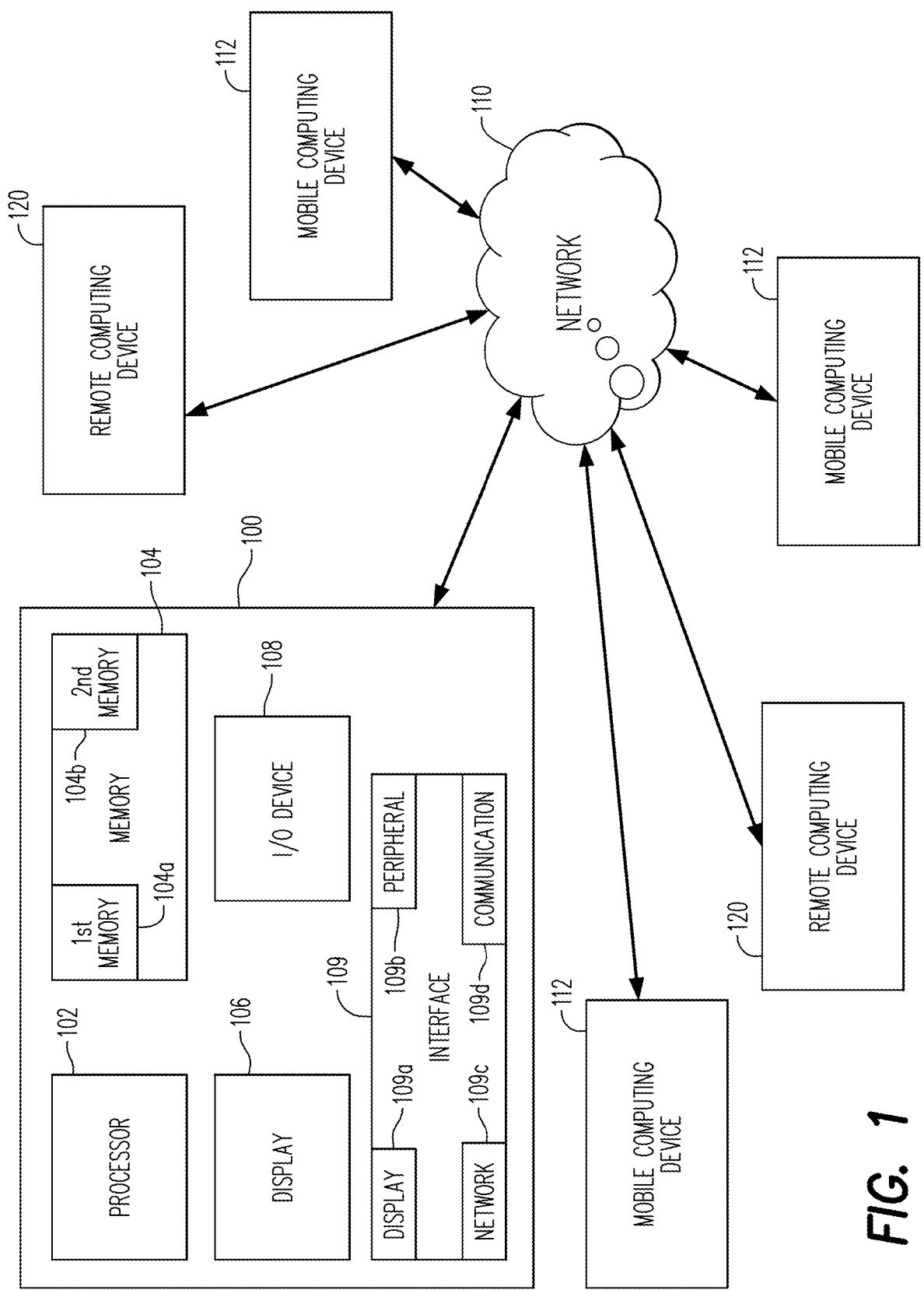
FIG. 1 illustrates an overview of a map generation system in accordance with an exemplary embodiment of the present disclosure.

As shown in FIG. 1, the system includes a venue management system 100 configured for generating and/or managing the generation of venue maps. The venue map management system (VMMS) 100 includes a processor 102, memory 104, a display 106, an input/output device 108, and one or more interfaces 109. The VMMS 100 can be connected to a network 110 for communicating with a plurality of processing devices 112. The processing devices 112 can be remote devices associated with and/or used to communicate interior feature data related to a physical structure and/or space to the venue management system 100 over the network 110. The interior feature data can include the floorplan of the structure and one or more interior points of interest (e.g., rooms, areas, structures, or any other interior features of relevance as desired). The processor 102 can be configured with program code for generating a user interface 109a (e.g., graphical user interface, application program interface, etc.) for output to the display 106. The user interface 114 allows the display to generate user prompts and with an operator and performs the process steps necessary for generating maps based on the input information. The memory 104 is configured to store venue maps along with data and/or information related to each structure for which a map is or is to be generated.

The processor 102 can be configured to execute management software code for providing various map management and map generation features. For example, the processor 102 can be configured to manage the storage of floorplan data and attributes associated with a venue, determine whether a threshold amount of information necessary for generating a venue map has been received, generate a final venue map using the floorplan data and attributes stored in memory; and generate route guidance data for overlaying on the final venue map, when geolocation data is received in real-time from a mobile computing device 112 via the interface 109.

The VMMS 100 of FIG. 1 may be implemented in a computer system using hardware, software, firmware, non-transitory computer readable media having instructions stored thereon, or a combination thereof and may be implemented in one or more computer systems or other processing systems. Hardware, software, or any combination thereof may embody modules and electronic components such as one or more computing devices used to implement the methods of FIGS. 2-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor 102 or processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit, and a hard disk installed in hard disk drive.

Various embodiments of the present disclosure are described in terms of this exemplary computer system. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor 102 may be a special purpose or a general purpose processor device programmed with computer code to perform the specialized function required to implement the exemplary embodiment disclosed herein. The processor 102 may be connected to a communications infrastructure, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The memory 104 of the computer system may also include a main memory 104a (e.g., random access memory, read-only memory, etc.), and may also include a secondary memory 104b. The secondary memory 104b may include the hard disk drive and a removable storage drive, such as a floppy disk drive, a magnetic tape drive, an optical disk drive, a flash memory, etc.

The removable storage drive may read from and/or write to the removable storage unit according to known protocols and processes manner. The removable storage unit may include a removable storage media that may be read by and written to by the removable storage drive. For example, if the removable storage drive is a floppy disk drive or universal serial bus port, the removable storage media unit may be a floppy disk or portable flash drive, respectively. In one embodiment, the removable storage unit may be non-transitory computer readable recording media.

In some embodiments, the secondary memory 104b may include alternative means for allowing computer programs or other instructions to be loaded into the computer system of the VMMS 100. Such means can be related to the removable storage unit and an interface, and may include, for example, a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

As already discussed, the memory 104 can include a main or first memory 104a and/or a secondary memory 104b. Data stored in the memory 104 (e.g., in the main memory 104a and/or the secondary memory 104b) of the VMMS 100 computer system may be stored on any type of suitable computer readable media, such as optical storage (e.g., a compact disc, digital versatile disc, Blu-ray disc, etc.) or magnetic tape storage (e.g., a hard disk drive). The data may be configured for storage in one or more physical or tangible storage mediums in the form of in any type of suitable database configuration, such as a relational database, a structured query language (SQL) database, a distributed database, an object database, etc. Suitable configurations and storage types will be apparent to persons having skill in the relevant art.

The interface 109 of the VMMS 100 can also include a network interface 109c enables the VMMS 100 to connect to any of a number of data communication networks. According to an exemplary embodiment the network interface can be configured with one or a combination of hardware and software components to connect to one or more wired or wireless networks for communication with one or more other mobile computing devices 112. Map management software executing on the processor 102 can conduct handshaking protocols to establish connection with map guidance software executing on the one or more mobile computing devices 112. Once a connection between the map management software executing on the VMMS 100 and the map guidance software of the mobile computing device 112 is established, the VMMS 100 can send real-time route guidance data to the mobile computing device 112 for display on the map guidance interface. According to an exemplary embodiment, the processor 102 of the VMMS 100 is configured to send route guidance data to the graphical user interface for generating and updating a display of the venue map based on input provided by the user. The processor 102 generates the route guidance data based on the final venue map data stored in memory. The signals are generated in response to geolocation data received in real-time from the mobile computing device 112 over the network 110. The geo-location data being generated as a result of user input. The route guidance data includes a path from a starting location to a destination. The processor 102 evaluates the geo-location data received from the mobile computing device 112 and compares the received data to physical layout data of the corresponding structure or space stored in memory 104. The processor 102 provides graphical route guidance overlayed on the final venue map of the physical structure or space. The overlay can include color-coded arrows and/or highlighted path to show a complete route from a current position of the mobile computing device 112 to the destination within the structure or space.

The interface 109 of the VMMS 100 computer system may include a communications interface 109d. The communications interface 109d may be configured to allow software and data to be transferred between the computer system 100 and external devices (e.g., mobile computing device 112, remote computing device 120). Exemplary communications interfaces 109d may include a modem, a network interface (e.g., an Ethernet card), a communications port, a PCMCIA slot and card, wireless communication device, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

The interface 109 of the VMMS 100 computer system may further include a display interface 109a. The display interface 109a may be configured to allow data to be transferred between the computer system and external display. Exemplary display interfaces 109a may include high-definition multimedia interface (HDMI), digital visual interface (DVI), video graphics array (VGA), etc. The display interface 109a can include any suitable type of display device for displaying data (e.g., a graphical user interface) transmitted via the display interface of the computer system, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 104a and secondary memory 104b, which may be memory semiconductors (e.g., DRAMs, etc.). These computer program products may be means for providing software to the computer system. Computer programs (e.g., computer control logic) may be stored in the main memory and/or the secondary memory. Computer programs may also be received via the communications interface. Such computer programs, when executed, may enable computer system to implement the present methods as discussed herein. In particular, the computer programs, when executed, may enable the processor 102 to implement the methods illustrated by FIGS. 2-6, as discussed herein. Accordingly, such computer programs may represent controllers of the VMMS 100 computer system. Where the present disclosure is implemented using software, the software may be stored in a computer program product and loaded into the VMMS 100 computer system using the removable storage drive, interface, and hard disk drive, or communications interface.

The processor 102 may comprise one or more modules or engines configured to perform the map generation and map management functions of the VMMS 100 computer system. Each of the modules or engines may be implemented using hardware and, in some instances, may also utilize software, such as corresponding to program code and/or programs stored in the main memory or secondary memory. In such instances, program code may be compiled by the processor 102 (e.g., by a compiling module or engine) prior to execution by the hardware of the VMMS 100 computer system. For example, the program code may be source code written in a programming language that is translated into a lower level language, such as assembly language or machine code, for execution by the processor 102 and/or any additional hardware components of the VMMS 100 computer system.

The process of compiling may include the use of lexical analysis, preprocessing, parsing, semantic analysis, syntax-directed translation, code generation, code optimization, and any other techniques that may be suitable for translation of program code into a lower level language suitable for controlling the VMMS 100 computer system to perform the functions disclosed herein. It will be apparent to persons having skill in the relevant art that such processes result in the VMMS 100 of the being a specially configured VMMS 100 uniquely programmed to perform the functions discussed in detail herein.

Figure 2:
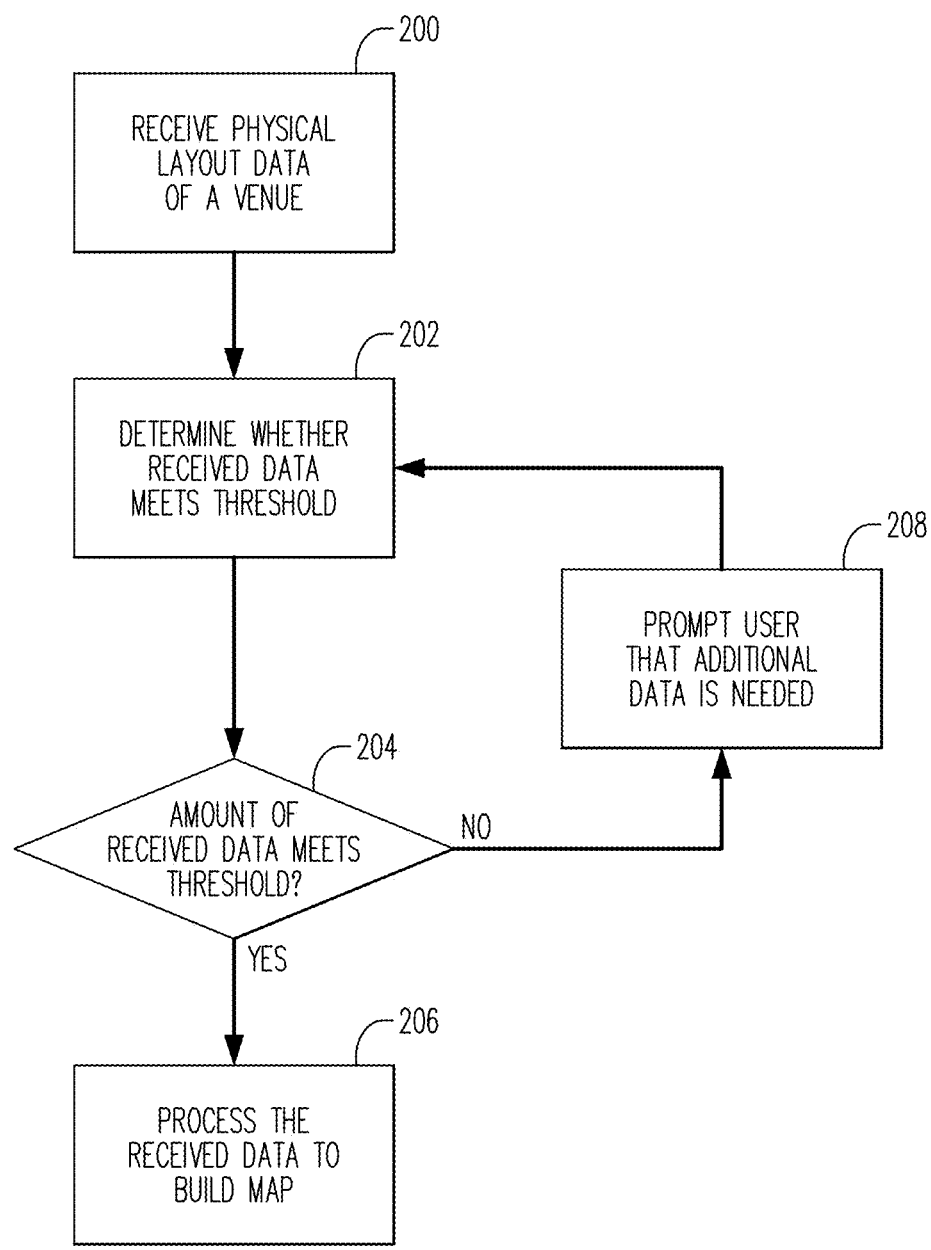
FIG. 2 is a high-level flowchart of a system process for generating an indoor map of a physical space in accordance with an exemplary embodiment of the present disclosure.

FIG. 2 is a high-level flowchart of a system process for generating an indoor map of a physical space.

As shown in FIG. 2, the venue map managing system (VMMS) 100 receives physical layout data associated with the venue (200). The physical layout data can include information and data including blueprints, CAD files or drawings, and any other information illustrating entry and/or exit paths, walkways, pathways, and an overall physical layout of the structure or space. The VMMS 100 determines whether all necessary data or at least a minimum threshold of information for a specified physical space has been received. If the received data is sufficient to build a map, the processor 102 processes the received data (202) to build the map (204,206). If insufficient data is received the user is prompted via the display interface that additional data is needed (204, 208). In performing the aforementioned steps and those of FIGS. 3-7 discussed in further detail herein, the processor 102 executes one or more software applications and/or computer programs as already discussed, which upon input or prompting from a user (designer, manager) control the processor 102 for performing system management and/or map generation features.

Figure 3:
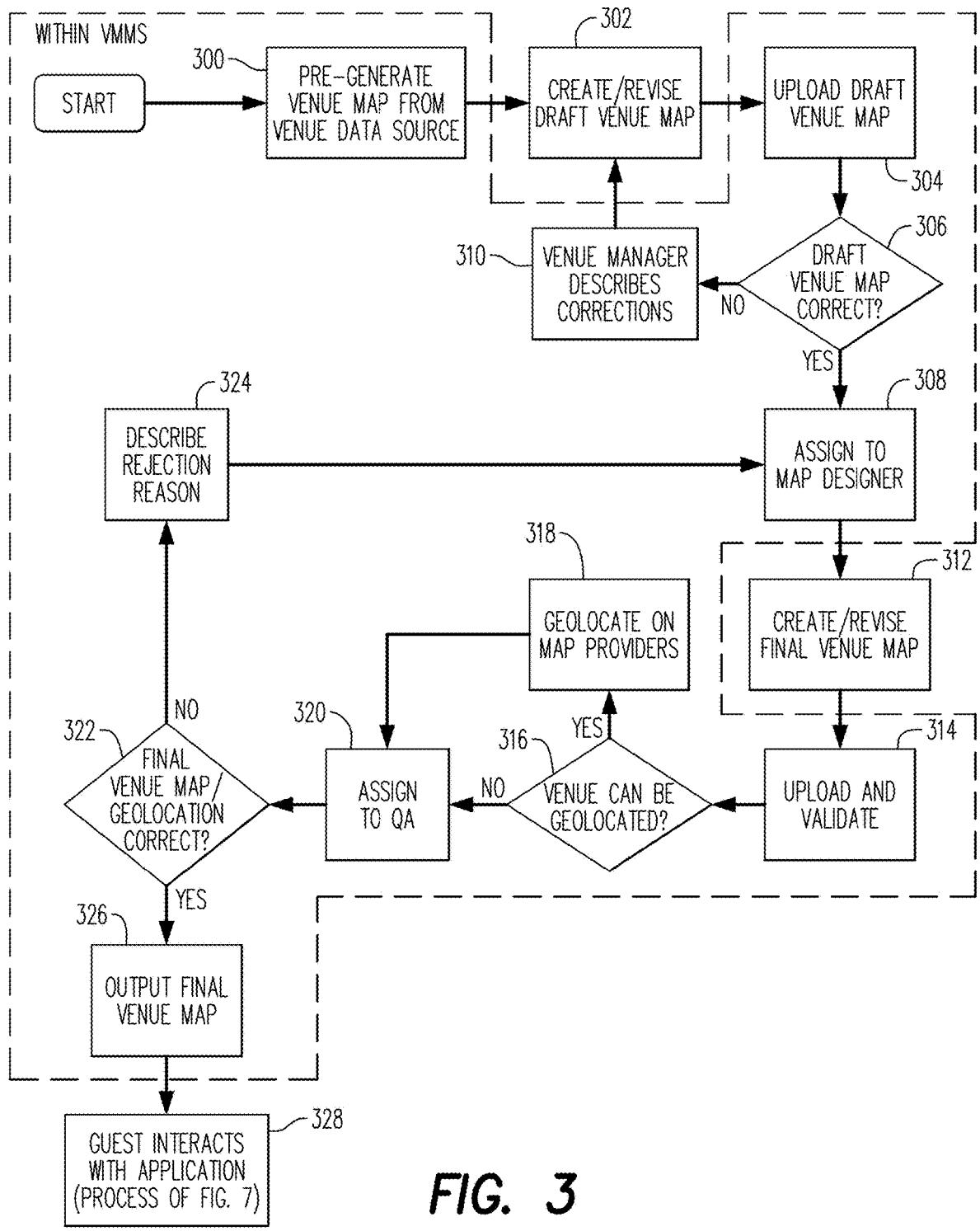
FIG. 3 is a flowchart of a first system process for generating a venue map in accordance with an exemplary embodiment of the present disclosure.

FIG. 3 is a flowchart of a first system process for generating a venue map in accordance with an exemplary embodiment of the present disclosure.

As shown in FIG. 3, after determining that the threshold amount of venue data has been received to generate a map, the processor 102 generates a shell venue map from the venue data source (300). The shell venue map includes a general layout or floor map of the venue without any special text, icons, nodes, or other attributes suitable for providing route guidance. A designer may then revise the shell map to generate a draft venue map that includes specific reference points, physical features, and landmarks as desired (302). The creation of the draft venue map can be performed using one or more processes and/or processors that are external to the VMMS 100. For example, the draft venue map can be generated on a separate computer device and processor that is remote to the processor 102 and not under the control of the software or computer program modules of the VMMS 100. The draft venue map can be communicated to the VMMS 100 from the remote computing device 120 and uploaded to memory 104 (304). The processor 102 of the VMMS 100 evaluates the draft venue map to determine whether it is correct by comparing the draft venue map to the venue data that was initially received (306). If the draft venue map is correct or accurate the processor 102 assigns the map to a designer (308). On the other hand, if the draft venue map is not correct the processor 102 generates a prompt for identifying and/or describing the corrections that are necessary (310). The designer reviews and revises the draft map to create a final venue map (312). The final venue map may include a geolocation of the venue onto a world geodetic coordinate system. The designer validates and uploads the final venue map to memory 104 (314). Next, the designer determines whether the final venue map can be geolocated (316). If so, the designer pins the final venue map to the location address found on any one of the mapping services provided by Google or Bing or OpenStreetMap, or any other suitable mapping service as desired (318). Here again, the review and revision of the draft venue map can be performed on a remote computing device 120 having a processor not under the control of the VMMS 100. For example, in another exemplary embodiment, the final map can be communicated from the remote computing device 120 to the VMMS 100 over the network and uploaded to memory 104 for validation (314). If the final venue map can be geolocated, the processor 102 generates coordinates for final venue map and locates map onto pre-existing geolocated building provided in any of the known web mapping services (316,318). In addition, the VMMS 100 will produce world geodetic coordinates for all spaces within the venue.

Figure 5:
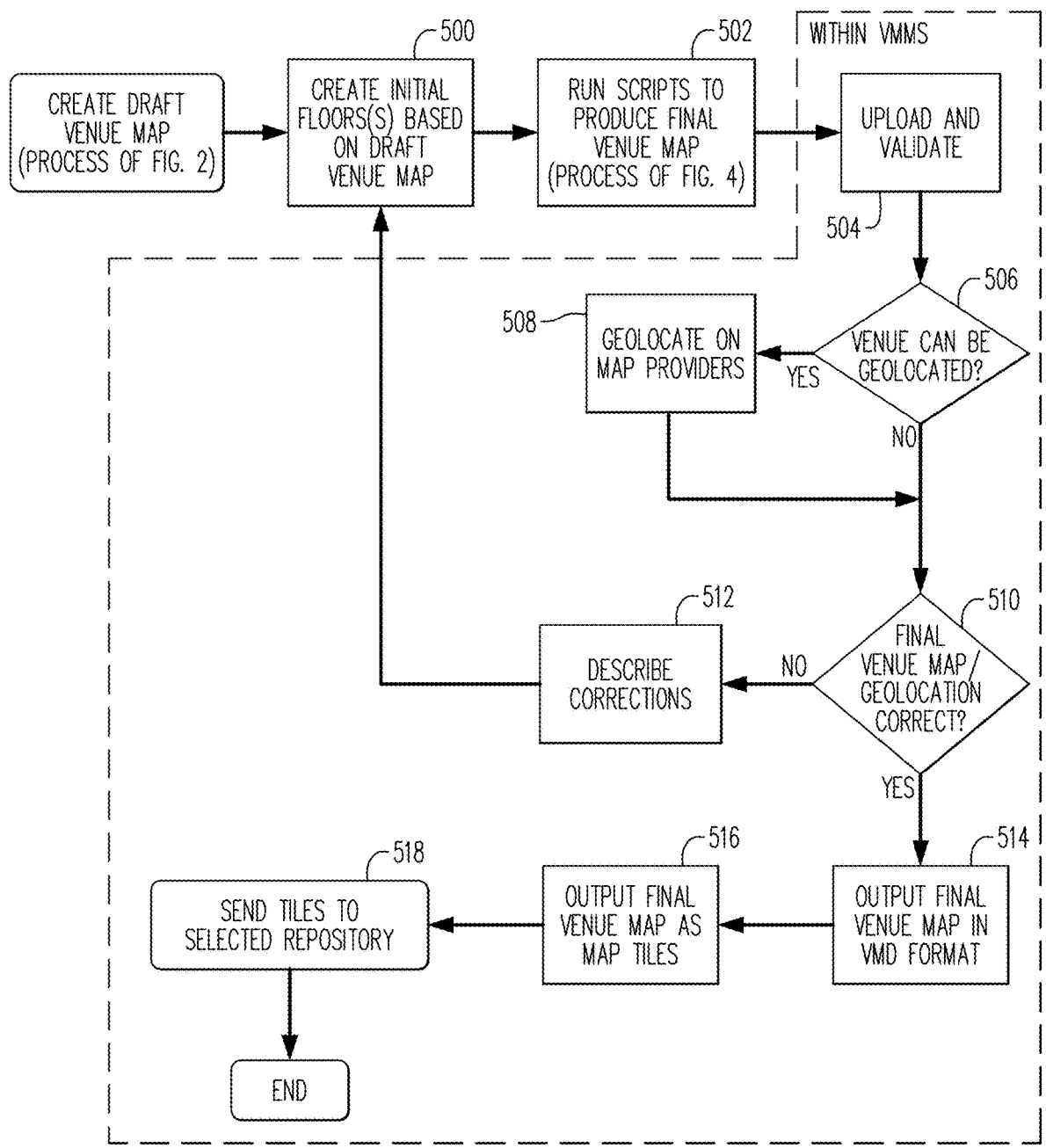
FIG. 5 is a flowchart of a third system process for generating a draft venue map in accordance with an exemplary embodiment of the present disclosure.

As shown in FIG. 3, the final venue map undergoes a quality review regardless of whether it can or cannot be geolocated (320). The quality assurance review determines whether the final venue map is correct and/or the geolocation performed by the designer is correct. If either the final venue map or the geolocation of the final venue map are incorrect the processor 104 prompts the reviewer to identify errors and reassign the map to a designer for revision (322, 324, 308). On the other hand, if final venue map and/or the geolocation are correct then the final venue map is released from the design phase within the VMMS 100 and stored in memory for use in route guidance (322, 326, 328). For example, as shown in FIG. 5, the final map can be output in VMD format and in the form of map tiles. The map tiles can then be sent to a specified database or memory for storage. If any problems with the map are detected or identified upon use for route guidance, the map can be reassigned to a designer for revision, validation, and geolocation as already discussed.

Figure 4:
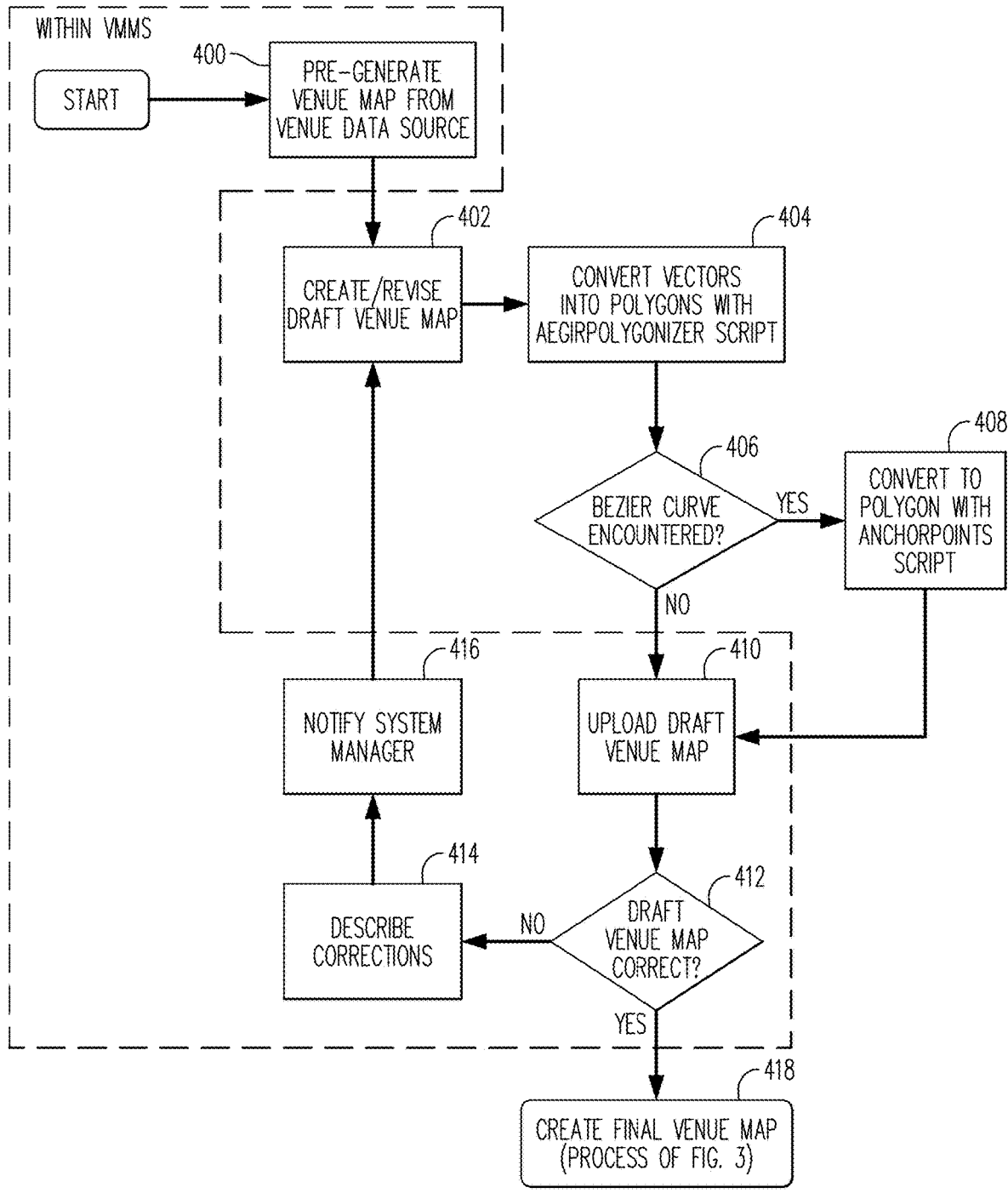
FIG. 4 is a flowchart of a second system process for generating a venue map in accordance with an exemplary embodiment of the present disclosure.

FIG. 4 is a flowchart of illustrating a process of creating and/or revising a vector venue map in accordance with an exemplary embodiment of the present disclosure. As shown in FIG. 4, the processor 102 generates a vector venue map based on the received venue data (400,402). Once the vector venue map is created, the processor 102 can communicate the vector venue map to a remote computing device 120 on the network 110. It should be understood by one of ordinary skill in the art that the processor 102 can be configured to perform the below described process steps on the vector venue map.

The remote computing device 120, which is under the control of map generation software, converts each map vector into at least one anchor point to generate a converted venue map (404). The anchor points can be represented as a polygon or any other attribute as desired. Next, the remote computing device 120 determines whether the converted venue map includes at least one Bezier curve (406) and any are identified, the remote computing device 120 converts them into anchor points (408). The remote computing device 120 communicates the converted venue map to the VMMS 100 (410).

The processor 102 compares at least one feature of the converted venue map with the physical layout data to determine if the physical layout data is correct (412). For example, the processor 102 compares the converted map with the one or more of physical layout data received in association with the physical space and stored in memory. The processor 102 determines whether any deviations between the converted map and the physical layout data are within accepted tolerances or are outside of predetermined thresholds. If the converted map is outside of accepted tolerances or predetermined thresholds then the processor 102 generates a prompt that identifies the inconsistencies (512) and indicates that revision of the converted map is necessary, and processing the converted map to revise and/or identifies necessary revisions (414, 416, 402). When the processor 102 determines that the converted map is within the accepted tolerances then a final venue map is generated for the physical space (418). It should be understood that if the physical structure or space has multiple floors then the foregoing process can be repeated for each floor. According to an exemplary embodiment, a final map for each floor can be generated. Once all floors have been generated, they can be linked as necessary based on the physical layout data and used to generate a final venue map. The final venue map can be stored in memory 104 within the VMMS 100. The processor 102 can also be configured to generate a message sending the final venue map to another processing device connected to the network.

The processor 102 of the VMMS 100 generates the final venue map by generating wayfinding nodes and paths for the one or more maps associated with a physical space according to any one of known map generation processes. The one or more maps can include a map for each floor or subspace (e.g., room, closet, chamber, partitioned area) within the physical structure. The individual floors can have a unique layout (e.g., unique features, landmarks, or points of interest) or in the alternative be substantially similar as determined by the specifications of the physical layout data stored in memory.

FIG. 5 is a flowchart of a third system process for generating floors for a draft venue map in accordance with an exemplary embodiment of the present disclosure. As shown in FIG. 5, once the draft venue map is created as shown in the process of FIG. 3, an initial floor is created based on the draft venue map (500). A user initializes scripts on the draft venue map to produce a final venue map as shown in FIG. 4 (502). The finalized venue map is validated and uploaded to memory 104 of the VMMS 100 (504). The VMMS 100 determines whether the venue map can be geolocated (506). If the venue map can be geolocated then the processor pins the venue map to the proper and associated location address found on any one of the mapping devices provided by Google, Bing, OpenStreetMap, or any other suitable mapping service as described (508). If the map cannot be geolocated, then the map is identified as needing further processing to determine and correct the reason(s) geolocation cannot be performed (510, 512). To correct the errors, the floor map is recreated or revised as processing returns to step 500. If the further processing corrects the error(s) or determines that no error(s) exist the final venue map is output in VMD format (514). The processor 102 then generates map tiles within the final venue map (516). The map tiles can be generated using any one of known tiling and/or rendering applications such as leaflet, Qtiles, Tile-Mill, MapFiler, or any other suitable application as desired. Tiling the final image allows for zooming and panning operations to be performed within the building, floor, and/or room level views. Once the tiles are generated, they are sent to memory 104 for storage. The map files can be sent to a repository or memory 104 for storage (518).

Figure 6:
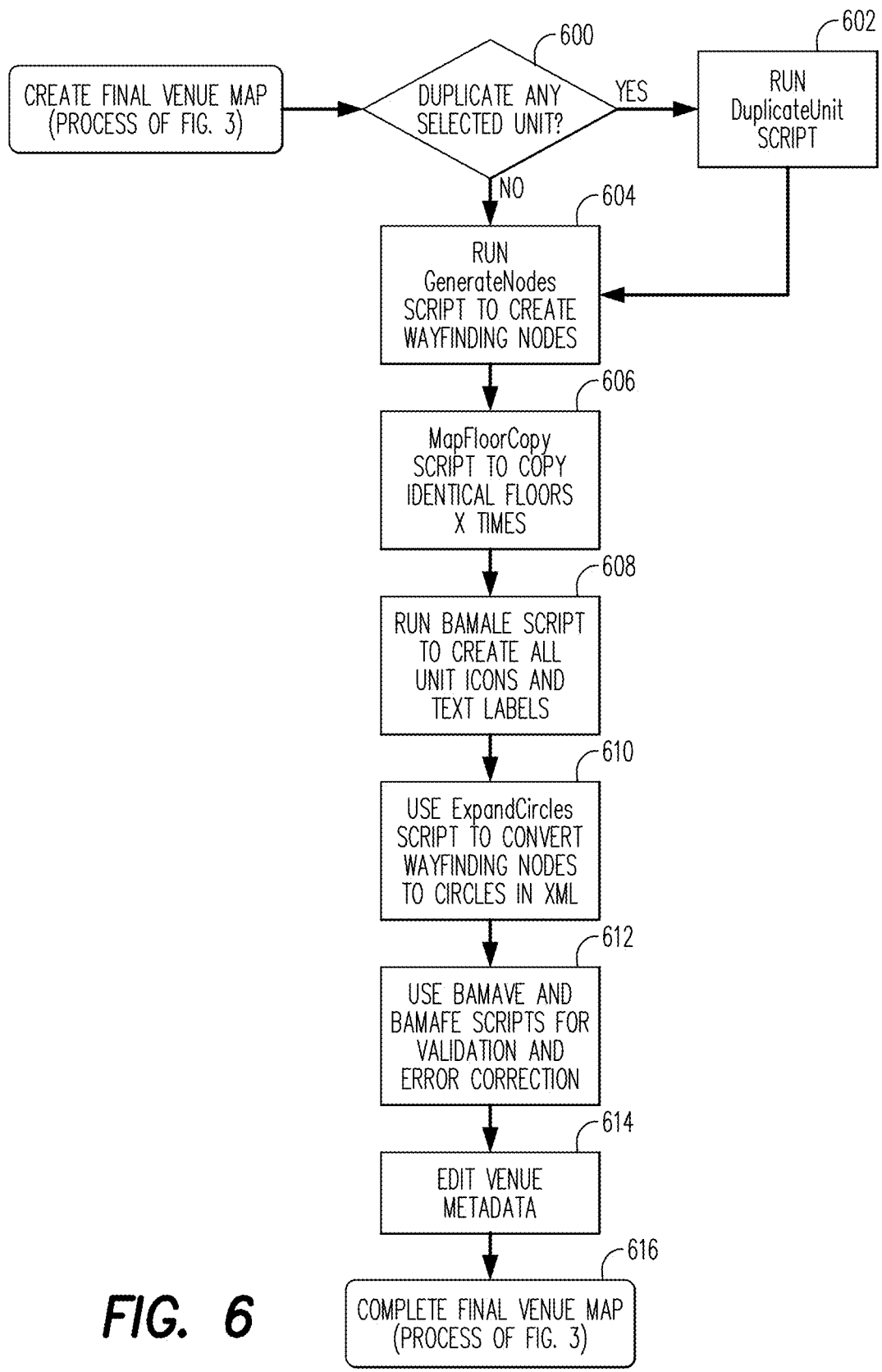
FIG. 6 is a detailed flowchart of a process for creating a final venue map in in accordance with an exemplary embodiment of the present disclosure.

FIG. 6 is a detailed flowchart of a process for creating a final venue map in in accordance with an exemplary embodiment of the present disclosure.

The designer initiates the process of a remote computing device 120 connected to the processor 102 of the VMMS 100 for generating the final venue map. As shown in FIG. 6, the designer is prompted to indicate whether any units or features of the draft venue map are to be duplicated (600). If duplication is required, the processor 102 initiates the duplication based on a command input from the designer (602). Once the duplication process has completed or no duplication of features in the draft venue map is required, the remote computing device 120 initiates a script to generate wayfinding nodes within the venue map (604). When the wayfinding nodes are generated, the remote computing device 120 prompts the designer via the display screen to indicate whether the current venue floor map is to be duplicated for identical floors and how many floors require duplication (606). The remote computing device 120 prompts the designer to create icons and text labels for features of the venue map (608). Once all desired icons and text labels are created, the remote computing device 120 initiates a script to convert the wayfinding nodes to circles (610). Following the conversion of the wayfinding nodes, the remote computing device 120 prompts the designer for performing validation and error correction on the venue map (612). The remote computing device 120 prompts the designer to edit the metadata for the venue map (614). Once all edits are made, the designer is prompted to save the venue map as the final venue map in memory 104 (616).

Figure 7:
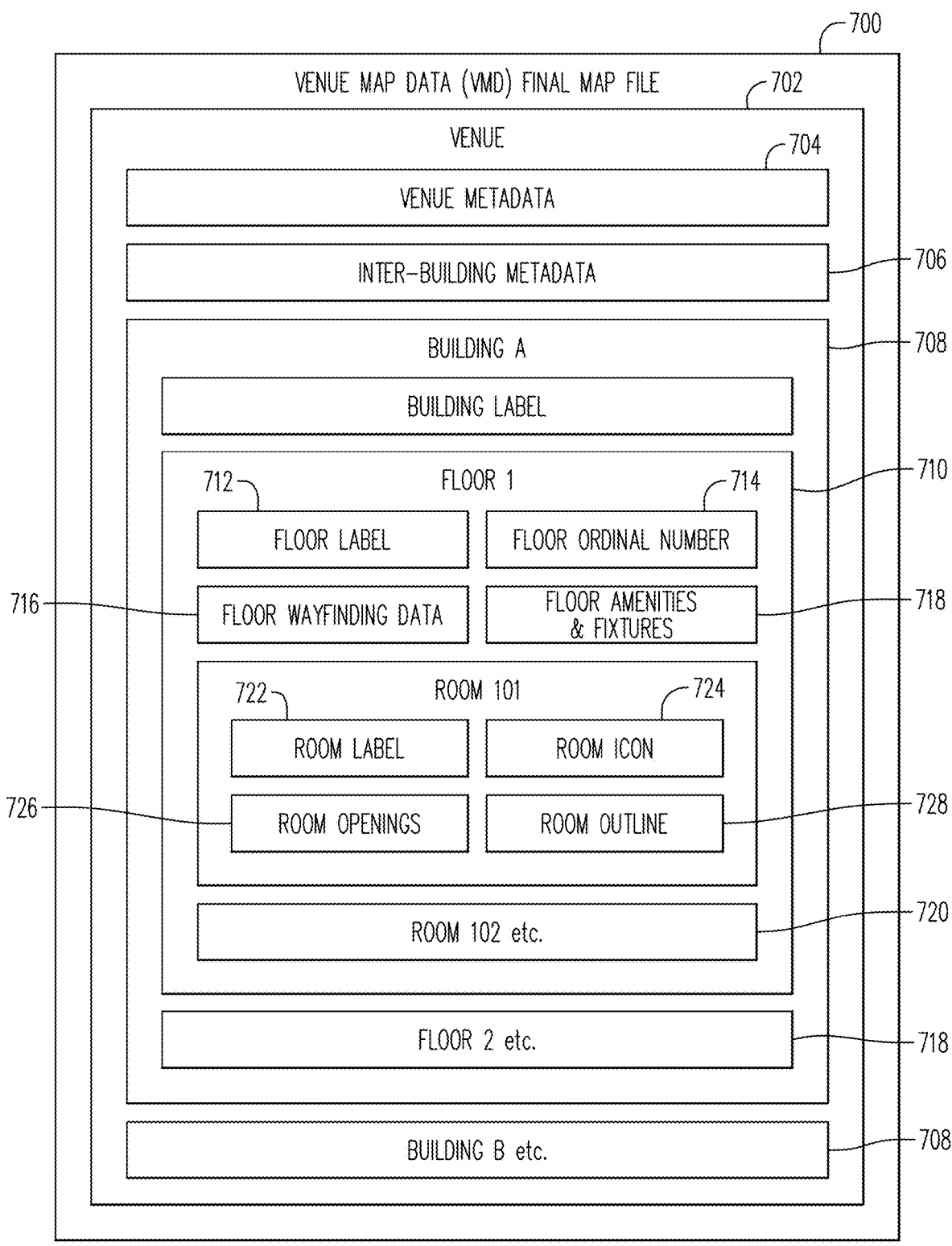
FIG. 7 is a diagram of the structure of a Venue Map Data file in accordance with an exemplary embodiment of the present disclosure.

FIG. 7 is a diagram of the structure of a Venue Map Data file in accordance with an exemplary embodiment of the present disclosure. The Venue Map Data file 700 defines the physical layout data stored in memory can include information providing various attributes and characteristics of the physical structure. As shown in FIG. 7, the VMD can be configured to include data that identifies at least the Venue 702, Venue metadata 704, data between buildings 706, one or more buildings of the venue 708, and one or more floors within a building 710. Each map feature (e.g., landmark, waypoint, node, or other suitable feature as desired) can be described with positional or physical attributes, such as information that specifies a spatial relationship with respect to another feature. For example, the building data 708 can include a building label and data that specifies the data for each floor within the building. Each floor 710 can include a floor label 712 or ordinal number 714, floor wayfinding data 716 and floor amenities and fixtures (e.g. features) 718. Ordinal numbers 714 define the position of the floor 710 within the building 708. The wayfinding data 716 defines information for mapping or determining a route to the floor 710. Each floor 710 can include any number of rooms 720. Each room 720 includes a room label 722, a room icon 724, an identifier of whether the room is open 726, and a room outline (layout?) 728. The VMMS 100 can also store data that describes ornamental attributes of the map feature such as a color, shape, identity, size, or other suitable attribute as desired. Through the map management software, the processor 102 is configured to generate textual route guidance using a syntax selected at the processing device. For example, the textual route guidance can be overlayed on the map and identify an upcoming route event. The route event can include a change in direction of the route such as a turn, a feature of the physical space including stairs or a stairwell, a door, and/or a landmark, such as a desk, plant, sculpture, fountain, or other physical feature provided in the structure or space.

The computer program code for performing the specialized functions described herein can be stored on a medium and computer usable medium, which may refer to memories, such as the memory device, which may be memory semiconductors (e.g., DRAMs, etc.). These computer program products may be non-transitory means for providing software to the VMMS. The computer programs (e.g., computer control logic) or software may be stored in the memory device. The computer programs may also be received via the communications interface. Such computer programs, when executed, may enable the VMMS to implement the present methods as discussed herein. In particular, the computer programs, when executed, may enable processor to implement the methods as discussed herein. Accordingly, such computer programs may represent controllers of the VMMS. Where the present disclosure is implemented using software, the software may be stored in a computer program product or non-transitory computer readable medium and loaded into the VMMS using a removable storage drive, an interface, a hard disk drive, or communications interface, where applicable.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A non-transitory computer readable medium storing program code for generating route guidance data for a physical structure, when placed in communication with a processor, the program code causes the processor to perform operations comprising:
   storing, in a memory device, physical layout data including a plurality of venue maps associated with one or more spaces of the physical structure, each venue map includes physical layout data for a physical space and, and data representing wayfinding nodes, paths, and landmarks of a physical space, and at least one of the plurality of venue maps having at least one anchor point defined from a Bezier curve;
   executing the program code stored in the memory for generating route guidance for the physical structure;
   receiving, in real-time from a network, location data identifying a current position within the physical structure;
   receiving the physical layout data associated with the physical structure from the memory device; and
   generating, in real-time, route guidance data by overlaying onto one or more selected venue maps, the route guidance data showing a travel path between an identified destination and a starting position of a mobile device, the route guidance data identifying, based on the physical layout data, a route event including a change in direction of the route and a unique feature of the physical space.

2. The computer readable medium of claim 1, wherein the route guidance data includes color-coded arrows and highlighting associated with the travel path.

3. The computer readable medium of claim 1, wherein the physical layout data includes information which identifies the physical structure as a venue, and physical layout data associated with the one or more physical spaces of the physical structure includes information identifying at least one of one or more buildings of the venue and one or more floors within the one or more buildings of the venue.

4. The computer readable medium of claim 3, wherein the identifying information for each floor comprises a floor label, floor wayfinding data, and structural features.

5. The computer readable medium of claim 3, wherein the physical layout data further comprises one or more rooms associated with each of the one or more floors of the venue.

6. The computer readable medium of claim 1, wherein the processor is a component of the mobile device.

7. The computer-readable medium according to claim 6, wherein the program code causes the processor to perform further operations comprising:
   receiving, a route guidance request from the user;
   generating signals for displaying a selected venue map of the physical structure based on the route guidance request and the location data identifying the current position within the physical structure; and
   displaying, on a display device, the route guidance data overlayed on the one or more selected venue maps.

* * * * *